US009058423B1

(12) United States Patent
Stone et al.

(10) Patent No.: US 9,058,423 B1
(45) Date of Patent: Jun. 16, 2015

(54) DYNAMIC ENVIRONMENT DEPLOYMENT WITHIN SYSTEM TESTS TO CLUSTERS, LOCAL MACHINES OR PRODUCTION

(75) Inventors: Matthew Stone, San Francisco, CA (US); Ravi Mistry, Los Gatos, CA (US); Jonathan Calvert, Redwood City, CA (US); Michael Bachman, Sunnyvale, CA (US); Murat Muth Ozturk, Bothell, WA (US); Yizhi Zhao, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 515 days.

(21) Appl. No.: 13/300,259

(22) Filed: Nov. 18, 2011

(51) Int. Cl.
*G06F 9/44* (2006.01)
*G06F 11/36* (2006.01)

(52) U.S. Cl.
CPC ........ *G06F 11/3664* (2013.01); *G06F 11/3672* (2013.01)

(58) Field of Classification Search
CPC .............. G06F 11/362; G06F 11/3664; G06F 11/3672; G06F 11/3684; G06F 11/3688
USPC .................................................. 717/121–135
See application file for complete search history.

(56) References Cited

U.S. PATENT DOCUMENTS

| 6,219,829 B1* | 4/2001 | Sivakumar et al. ........... 717/131 |
| 6,427,000 B1* | 7/2002 | Mumford et al. ................. 379/9 |
| 7,484,145 B1* | 1/2009 | Hushyar et al. ............... 714/724 |
| 2004/0088602 A1* | 5/2004 | Cohen et al. ..................... 714/38 |
| 2005/0166094 A1* | 7/2005 | Blackwell et al. .............. 714/38 |
| 2007/0234293 A1* | 10/2007 | Noller et al. ................... 717/124 |
| 2009/0300423 A1* | 12/2009 | Ferris .............................. 714/38 |
| 2010/0198799 A1* | 8/2010 | Krishnan et al. ............. 707/702 |
| 2011/0010691 A1* | 1/2011 | Lu et al. ........................ 717/124 |
| 2011/0083122 A1* | 4/2011 | Chen et al. .................... 717/124 |
| 2011/0239214 A1* | 9/2011 | Frields et al. ..................... 718/1 |
| 2011/0270975 A1* | 11/2011 | Troup ........................... 709/224 |
| 2011/0302571 A1* | 12/2011 | O'Farrell et al. ............. 717/170 |
| 2012/0084607 A1* | 4/2012 | Lam et al. .................... 714/38.1 |

OTHER PUBLICATIONS

Wikipedia, "Revision control," dated Nov. 6, 2011, last retrieved from http://en.wikipedia.org/w/index.php?title=Revision_control &oldid=459286093 on Jan. 25, 2014.*
Ebbers et al., IBM zEnterprise 196 Configuration Setup, Nov. 2010, IBM.*

* cited by examiner

*Primary Examiner* — Qing Chen
*Assistant Examiner* — Andrew M Lyons
(74) *Attorney, Agent, or Firm* — Birch, Stewart, Kolasch & Birch, LLP

(57) ABSTRACT

A continuous build and test system, method, and computer-readable medium, performed by one or more processors is described. The system includes an input for inputting a test specification that imports an environment manager. An environment manager object is created upon processing of the test specification, and delegates management functions to one or more specialized manager objects. The environment manager includes config data that designate paths to one or more binary files, and token settings specifying resources to be used during testing of the binary files. The environment manager selects a test platform to be used in testing the one or more binary files. The specialized manager objects perform testing, including bringing up the one or more binary files in the selected test platform, creating the data resources based on the token settings, performing the instructed tests, and cleaning up created data resources.

48 Claims, 9 Drawing Sheets

FIG. 3A

BINARY CONFIG

```
[info]
borg_config: production/borg/contentads/testing/cat2-testing-build.borg
server: False
```

Binary Config Tokens:
The following tokens are supported in binary configs:

$RESOURCE.$TABLE.$(table_name)
Signals to EM that it needs to create the specified table before bringing up this job. A [TABLE-table_name] section must also be added to the binary config that details the location of the schema_file and if the schema ownership should be changed to the ACL running the test.
Example usage in a binary config:

```
[args]
insertions_table: $RESOURCE.$TABLE.$(insertions)

[TABLE-insertions]
schema_file: ads/tv/testing/schemas/estimator/insertions.schema
change_ownership: True
```

$RESOURCE.$GFS.$(dir_path)
Signals to EM that it needs to create the specified dir_path before bringing up this job. The dir_path will be created relative to the basepath specified in the EM constructor.
Example usage in a binary config:

```
[args]
snapshotBasePath: $RESOURCE.$GFS.$(snapshot)
```

$RESOURCE.$LS.$(ls_path)
Signals to EM that it needs to create the specified ls_path before bringing up this job. The ls_path will be created relative to the ls_basepath used in EM.
Example usage in a binary_config:

```
[args]
schedules_table_lock: $RESOURCE.$LS.$()/schedules_table.lock
```

FIG. 3B

$RUNTIME.$UNIQUE
Allows clients to use the unique_id specified in the EM constructor as a value for a vars key.
Example usage in a binary config:

```
[args]
snapshot_dir_path: /namespace/test/$RUNTIME.$UNIQUE/test/
```

$FLAGS.flag_name
Points to locations of binaries and dependencies. Allows clients to use any flag as a value for a vars key.

Example usage in a binary config:

```
[args]
dbspec: $FLAGS.$(adsDbSpec)
dbport: $FLAGS.$(adsDbPort)
```

FIG. 4

Sample Config (Line numbers added for reference)

1: [info]  410

2: borg_config: binaryconfig.borg

3: server: True

4: healthz_msg: ok

5: job_name: budgetor-$RUNTIME.$UNIQUE.server

6:

---

7: [args]  420

8: snapshotBasePath: $RESOURCE.$GFS.$(snapshot)

9: insertions_bigtable: $RESOURCE.$BIGTABLE.$(insertions)

10: scheduledEventsBigtableName: $RESOURCE.$BIGTABLE.$(insertions)

11: user: $RUNTIME.$USER

12: qainstance: $RUNTIME.$UNIQUE

13: enableALO: false

14: DataBigtable: /bigtable/cell/name.data

15: deadline: 10800

16:

---

17: [BIGTABLE-insertions]  430

18: schema_file: /bigtable/location/schema/bt.schema

FIG. 5
BINARY CONFIG

[info]  (502)
build_config: build/tvads/qa/scheduler.build
server: True
log_name: serverlog

[args]  (504)

insertions_table: $RESOURCE.$TABLE.$(insertions)  (506)
schedules_table_lock: $RESOURCE.$LS.$()/schedules_table.lock qainstance: $RUNTIME.$UNIQUE  (508)

user: $RUNTIME.$USER  (510)

minCpmtableName: $RESOURCE.$TABLE.$(mincpm)  (512)

minCpmFilePath: $RESOURCE.$GFS.$(minCpm)/minCpm.xml  (514)

lastScheduleAttemptTimeFileName:
$RESOURCE.$GFS.$(scheduler/data/gfstmp)/scheduleAttempt.data
(516)

[TABLE-insertions]  (518)

schema_file: ads/tv/testing/schemas/estimator/insertions.schema
(520)

change_ownership: True

DYNAMIC ENVIRONMENT DEPLOYMENT WITHIN SYSTEM TESTS TO CLUSTERS, LOCAL MACHINES OR PRODUCTION

TECHNICAL FIELD

The following relates to a dynamic environment manager to test binary files (binaries) locally, deploy to distributed clusters, and deploy to production.

BACKGROUND

A production environment having a large number of servers and data centers distributed geographically would benefit from a capability of testing groups of components or systems in various environments. Types of testing can include system testing, integration testing, and end-to-end testing. Integration testing is a type of testing in which two or more sub-components are combined and tested as a group. Integration testing includes validating the interface, data contract and functionality between sub-components. Integration testing typically occurs after unit testing of the sub-components. End-to-end testing is performed by applying tests to a group of various systems, from start of a given process to finish and validation at both points, including intermediate validation at given steps.

The testing process may range from deployment of binaries locally against code built from a mainline system, to clusters for load or integration testing, and to production for larger system testing or data validation.

Much manual overhead is involved in maintaining large, production-like systems. The production-like systems are manually deployed, maintained, refreshed, and typically become stale. Engineering organizations may also deploy system tests by pointing to production binaries. This limits the ability to simulate test data or scenarios or point to mainline-built binaries.

BRIEF SUMMARY

A system, method and computer-readable storage medium are described. An input receives a test specification that includes a list of imports, the list of imports includes an environment manager. The environment manager, being created upon processing of the test specification, delegates management functions to one or more specialized manager objects. The environment manager includes config data that describes paths to one or more binary files, and token settings specifying resources to be created in a test environment for the binary files. A test platform can be either of a local machine and a distributed computing system. The environment manager selects the local machine or distributed computing system as the test platform to be used in testing the one or more binary files. The environment manager by way of the specialized manager objects performs testing, including loading and starting the one or more binary files in the selected test platform based on the paths to the binary files, creating the data resources in the selected platform based on the token settings, and performing the testing using the test environment.

The disclosed system, method, and computer-readable storage medium enables a simple configuration interface for specifying testing of various stages of binaries in various deployment environments with automatic creation and breakdown of resources, and without conflicts between test environments using common servers.

These and other aspects are described in detail with respect to the drawings. Other features, aspects, and advantages of the subject matter will become apparent from the description, the drawings, and the claims.

BRIEF DESCRIPTION OF THE DRAWINGS

The accompanying drawings constitute part of this specification. In the drawings.

FIGS. 3A, 3B show a specification of a binary config;

FIG. 4 shows an example binary config file;

FIG. 5 shows an alternative example binary config file;

DETAILED DESCRIPTION

A continuous build and test system provides a capability to deploy binaries to test locally (on a single machine), and deploy to distributed clusters (e.g., in a cloud). Deployment of the binaries is based on tokens and flags to the binaries, and is performed from an abstraction layer that is wrapped in a system integration test. The tokens and flags for the binaries can be specified through a simple mechanism in the form of binary configuration files or at runtime. The abstraction layer enables simplified calls for complex processes performed by a dynamic environment manager (DEM). The dynamic environment manager gathers information from binary config files. The binary config files provide a simple interface for the dynamic environment manager. Provided information specified in binary config files, the dynamic environment manager automates the creation of resources, thus reducing the complexity of client code. Binary config files can be constructed to enable system and integration tests to be deployed at a runtime mainline, at a release branch or at production binaries to a production-like cluster or a local machine, and utilize mocks, point to prior-built binaries, and/or create data stores.

Figure 1:
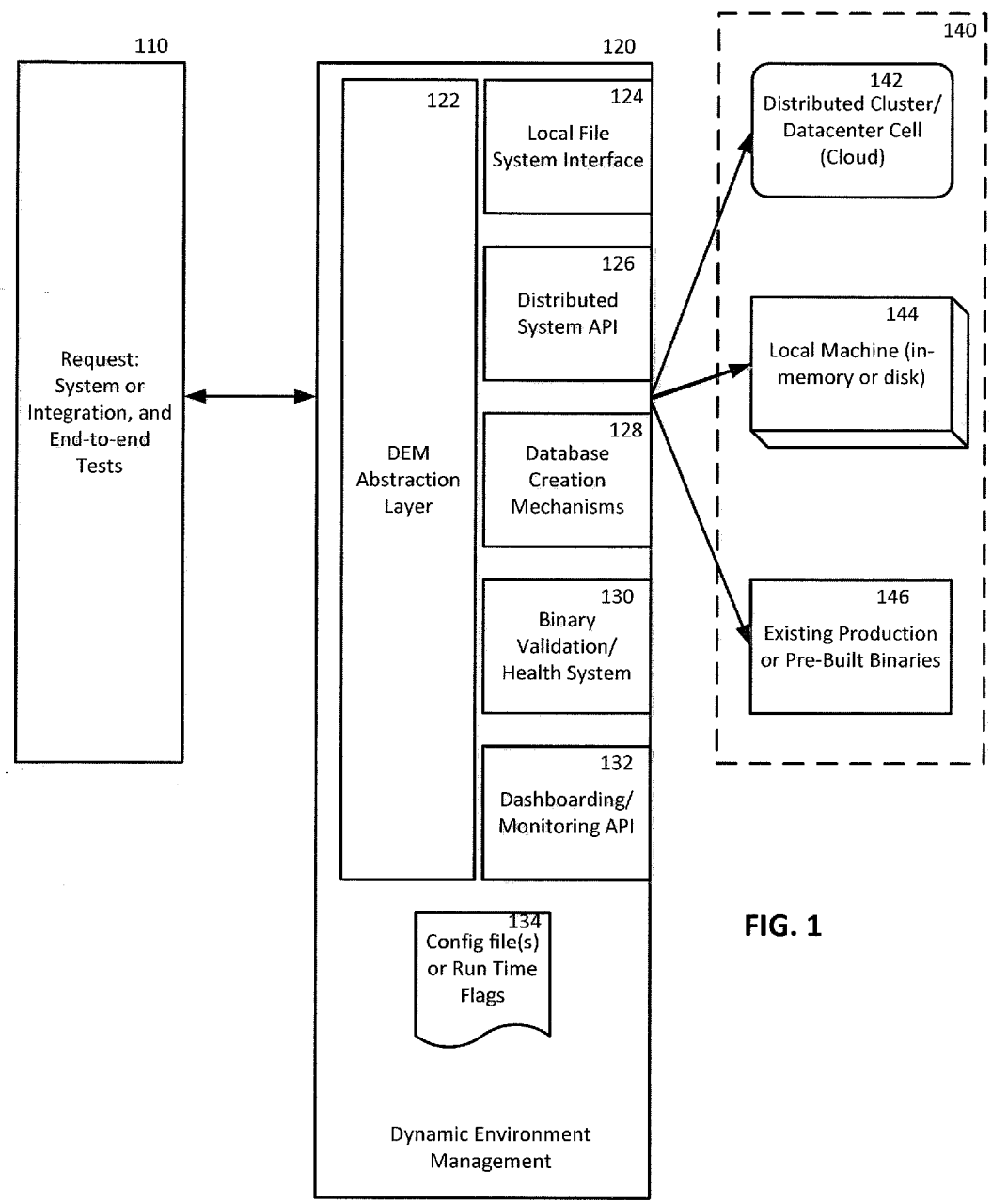
FIG. 1 is a system block diagram for testing in an example continuous build and test system.

FIG. 1 is a system block diagram for an example continuous build and test system. The build and test system is continuous in the sense that it can be run each time a developer makes a change to binaries. In addition, a binary file can bring up multiple jobs (servers). A test specification 110 includes the test environment 140 where the testing will be performed. In addition, the continuous build and test system can also link to one or more already existing binaries. The continuous build system can include a dynamic environment manager object 120 as an object that can be imported in the test specification. The dynamic environment manager object is threaded so that its methods can be run in parallel. Depending on the set of binaries, the testing may be a system, integration, or end-to-end test. During testing, binaries can be brought up in parallel or sequentially. The order of bringing up binaries (loading and starting each binary file) as sequential jobs can be specified in a binary config file.

The dynamic environment manager 120 can receive as input one or more binary configuration files 134 (binary configs). The Environment Manager 120 refers to the binary configs to obtain information about binaries to be brought up during a test. In the case of a server brought up by a binary, information that can be provided to the environment manager includes location of a distributed system config file, a special health string to check for, arguments with default values, information for automated creation of directories and database tables.

The distributed system config file is a configuration file that can be used in the case of deployment to a distributed system, in order to provide information about the data center to deploy to, what resources are required for the job (e.g., memory, CPU), what flags to pass to a running binary, and any system dependencies.

The binary configs use flags to point to binaries and dependencies and tokens to point to resources including data stores. Tokens are used in creation of resources. The binary configs can contain flags for one or more binaries and for data dependencies between binaries. The binary configs can contain tokens for resources to be created and for specifying where the resources will be created. The config file can also contain config tokens that specify attributes for the creation of data stores.

The dynamic environment manager 120 further includes an abstraction layer that utilizes the config flags and tokens set in the config file and performs flag-based deployment of binaries for testing.

As shown in FIG. 1, the DEM abstraction layer 122 is a layer above services, such as database creation, that allows actions to be carried out without the client having to directly call the services. Among the services that the abstraction layer 122 interacts with include a local file system interface 124, a distributed system API 126, a database creation mechanism 128, binary validation/health system 130, and dashboarding/monitoring API 132.

Also as shown in FIG. 1, the dynamic environment manager 120 can deploy a test in an environment 140, such as a local machine 144, a distributed cluster/datacenter cell 142 (for example as a cloud), or to a production-like environment that uses existing production or pre-built binaries 146.

The dynamic environment manager 120 can perform job health validation, automatic retry and failure logic, in order to make testing reliable.

When testing is completed, the dynamic environment manager 120 can perform a clean-up operation for servers that are involved during the testing, for all actions performed during testing, as well as clean-up of any resources and data stores that were created for the testing.

Figure 2:
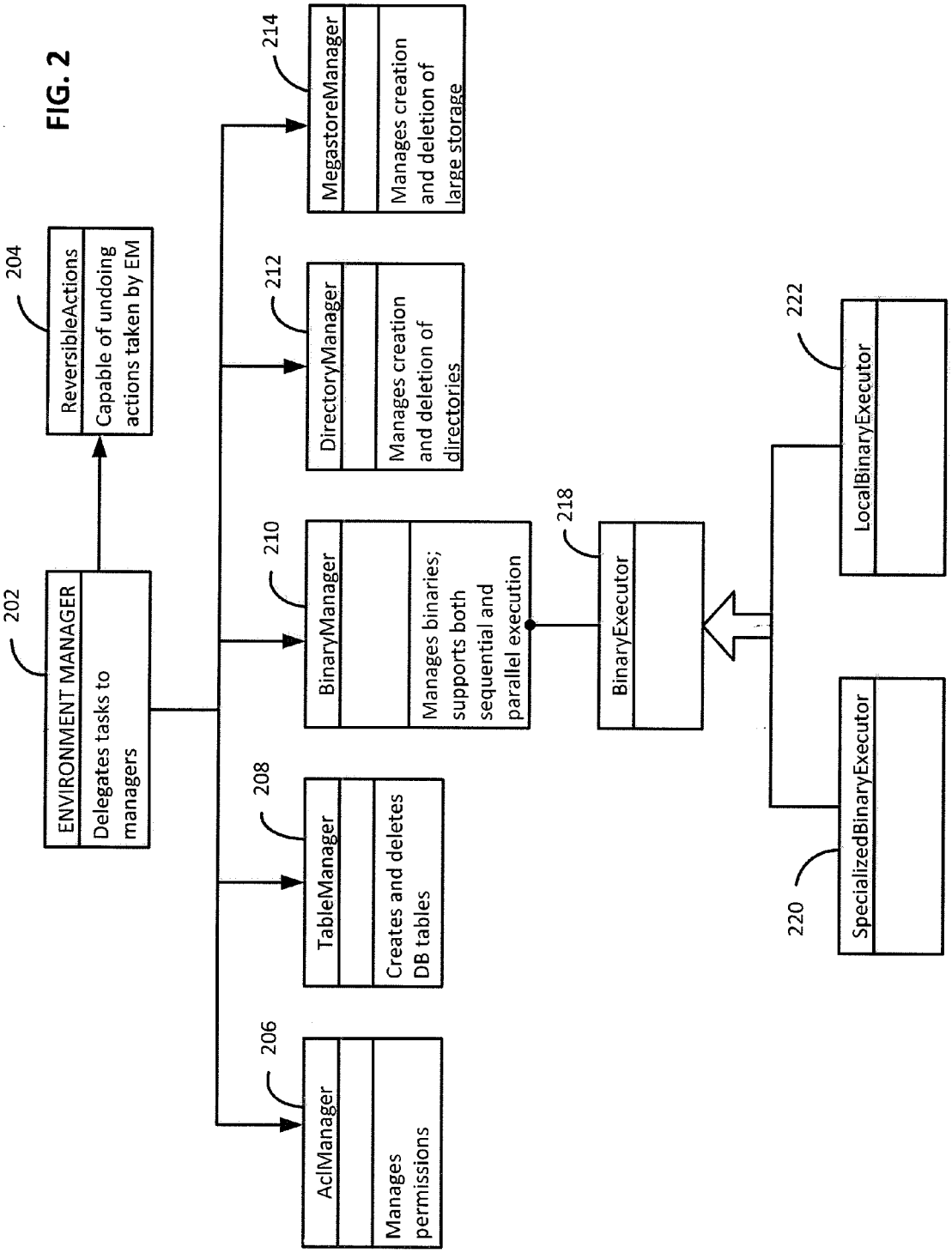
FIG. 2 is a block diagram for an example Dynamic Environment Manager.

FIG. 2 is a diagram showing details of an example implementation of the environment manager 120. The environment manager 120 can be implemented using an Environment Manager object 202. In the example implementation, the Environment Manager object 202 is a wrapper for other manager objects to delegate tasks to. The Environment Manager object 202 contains methods defined in the delegate managers. A Reversable actions object 204 keeps track of all actions taken by the DEM. At the end of testing, all actions can be undone (i.e., reversed). The Reversable actions object can also support persisting actions at a location in a distributed file system. This enables cleaning the environment with respect to a previous run before starting new tests.

A Access Control List (ACL) Manager object 206, Table Manager object 208, Binary Manager object 210, Directory Manager object 212, and Megastore Manager object 214 are manager objects that the environment manager object 202 can delegate tasks to.

The ACL Manager object 206 manages permissions and access to a particular job.

The Table Manager object 208 manages table creation and table deletion. Table creation is performed by a table creator.

The Table Manager object 208 includes methods for obtaining a table path and obtaining a table by a table name.

The Binary Manager object 210 manages both local and specialized binaries by using binary executors (Binary Executor 218, Local Binary Executor 222 and Specialized Binary Executor 220), which in turn use a configuration utility. The Binary Manager supports both parallel and sequential execution of binaries. The Binary Manager object 210 contains methods for starting and stopping binaries, as well as for starting queued binaries. The Binary Manager 210 includes a method to check a job health, and for getting information about binaries and jobs. The Binary Manager object 210 can obtain information from a system log.

The Directory Manager object 212 manages creation and deletion of namespace directories using gfile. The Directory Manager object includes methods for creating and deleting directories, and creating a path.

The Megastore Manager object 214 manages creation and deletion of Megastore. The Megastore Manager object 214 includes a method for setting up the Megastore, and can change a version of a Megastore.

Binary Configs

Binary configs include an info section, which can be designated by "[info], and arguments section, which can be designated by "[args]," and a database definitions section, which may be designated by "[Table-insertions]." The info section specifies whether the test environment will be a server, as well as specifies other input sources, such as a distributed system configuration file, and output sources, such as a log file. The arguments section specifies resources to be created and paths for resources. The database definitions section specifies database schemas. Although the binary configs are typically files, it is understood that other means of storage and/or for providing configuration information can be used. For example, it is possible for configuration information to be obtained from an external source, either all at once, or on an as needed basis.

FIGS. 3A, 3B show examples of tokens supported in binary configs. Although the tokens are shown as specific format and naming, naming and format can be varied as long as they are consistent with the Environment Manager API, and are comprehendable by the user. It is noted that paths specified in a config file are typically relative paths, to for example a base path. Although directory paths are used in the provided examples, paths may also be virtual paths, or be specified using URL's.

The $RESOURCE.$TABLE.$(TABLE_NAME) informs the DEM that it needs to create the specified table before bringing up the job. A [TABLE-table_name] in the config is used to specify the location of the schema, and if the ACL running the test should own the schema.

The $RESOURCE.$GFS.$(dir_path) informs the DEM that it needs to create the specified dir_path before bringing up the job. The dir_path is created relative to the basepath, that is specified in the DEM constructor.

The $RESOURCE.$LS.$(ls_path) informs the DEM that it needs to create the specified ls_path before bringing up the job. The ls_path will be created relative to the is basepath used in the DEM.

The $RUNTIME.$UNIQUE is used to specify a unique job within the environment. It allows clients to use the unique_id specified in the DEM constructor.

The $FLAGS.flag_name allows clients to use a flag to point to binaries and dependencies, and can be used to specifiy a value for a vars key (a vars page for health checking).

FIG. 4 shows an example binary config file. The example config file includes an "info" section 410, "args" section 420, and data store definition section 430. The "info" section 410 contains information that is to be used by a server. In the example, the attribute "healthz_msg" indicates a string to be returned by the server. The attribute "job_name" indicates a template having a position to insert a unique id into a server name. The unique id is used in naming servers and resources in order to prevent conflicts with other automated tests using the same test environment. The continuous build and test system can also use the unique name to preempt the test job in a distributed cell.

The "args" section 420 contains the tokens that are to be passed to the local machine or to the server. Tokens include, for example, pointers to resources and data stores that are to be created and used during a test. In the example, the token "snapshotBasePath" indicates a resource key that denotes a resource that the Environment Manager 120 will create before bringing up the server. The tokens "insertions_table" and "scheduledEventstableName" reference a data store to be created by the Environment Manager 120. The data store definition section 430 contains a reference to a schema for the data store to be created.

FIG. 5 shows another example of a binary config file. This binary config file includes an info section ([info] 502), an arguments section ([args] 504), and a table insertions section ([TABLE-insertions] 518). The info section specifies that the environment will be a server and that a log of binaries will be saved with the name "severlog." The info section also indicates the location of a distributed system config file.

The arguments section specifies locations of resources and resources that need to be created. FIG. 5 shows that a database 506 is a resource to be created, and shows the relative location of the database. The arguments section specifies a unique name 508 to be used in identifying the job associated with the binary config. The unique name enables the server to keep the job and its resources separate from other jobs. The arguments section also specifies a user 510. In addition to specifying creation of a database at a location, the arguments section specifies the location of other resources: including a table 512, and the files "minCpm.xml" 514 and "scheduleAttempt-.data" 516. The table insertions section specifies a location of a schema for the database, as "insertions.schema" 520.

Dynamic Environment Manager—Operation

Figure 6:
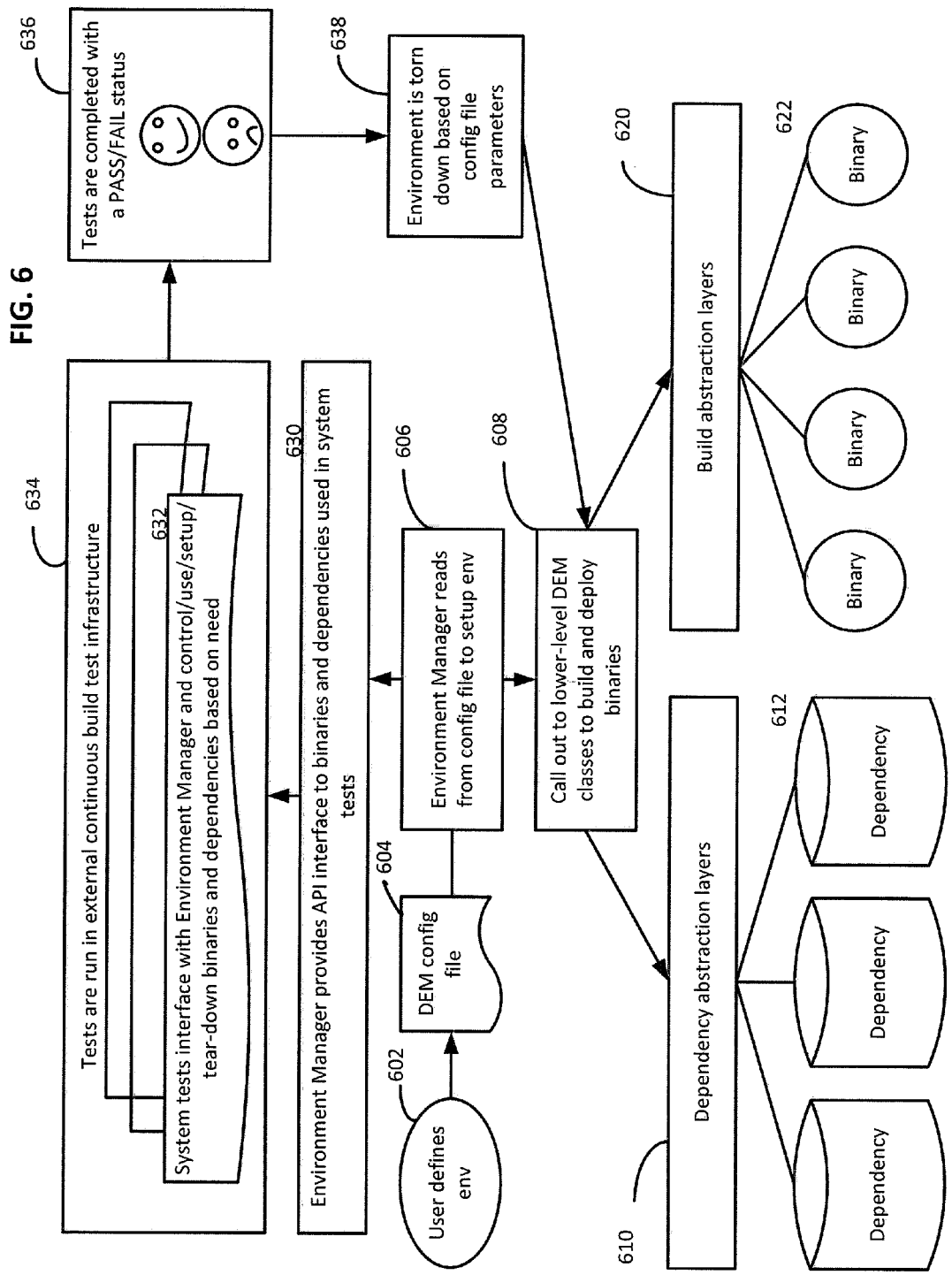
FIG. 6 is a workflow diagram for the example Dynamic Environment Manager.

FIG. 6 shows a workflow diagram for operation of the DEM. As can be seen in the diagram, a user defines the destination environment 602 (which may be defined in a distributed system config file) and creates a binary config file 604 that specifies the set of binaries to be tested. The DEM reads from the binary config file to set up the environment 606. A call is made to lower-level DEM objects to build and deploy the binaries 608. The call out to lower level objects include calls to dependency abstraction layers 610, which create the dependencies 612. The call out to lower level objects also includes calls to build abstraction layers 620. The build abstraction layers start up binaries 622.

In the test environment, the DEM provides an API interface to binaries and dependencies as they are used in system tests 630. Tests can be run in an external continuous build test infrastructure 634. System tests interface with the DEM and control, use, setup, tear-down binaries and dependencies as needed 632. Tests are completed as pass/fail status 636. After completion of the tests, the environment is torn down based on binary config file parameters 638.

Figure 7:
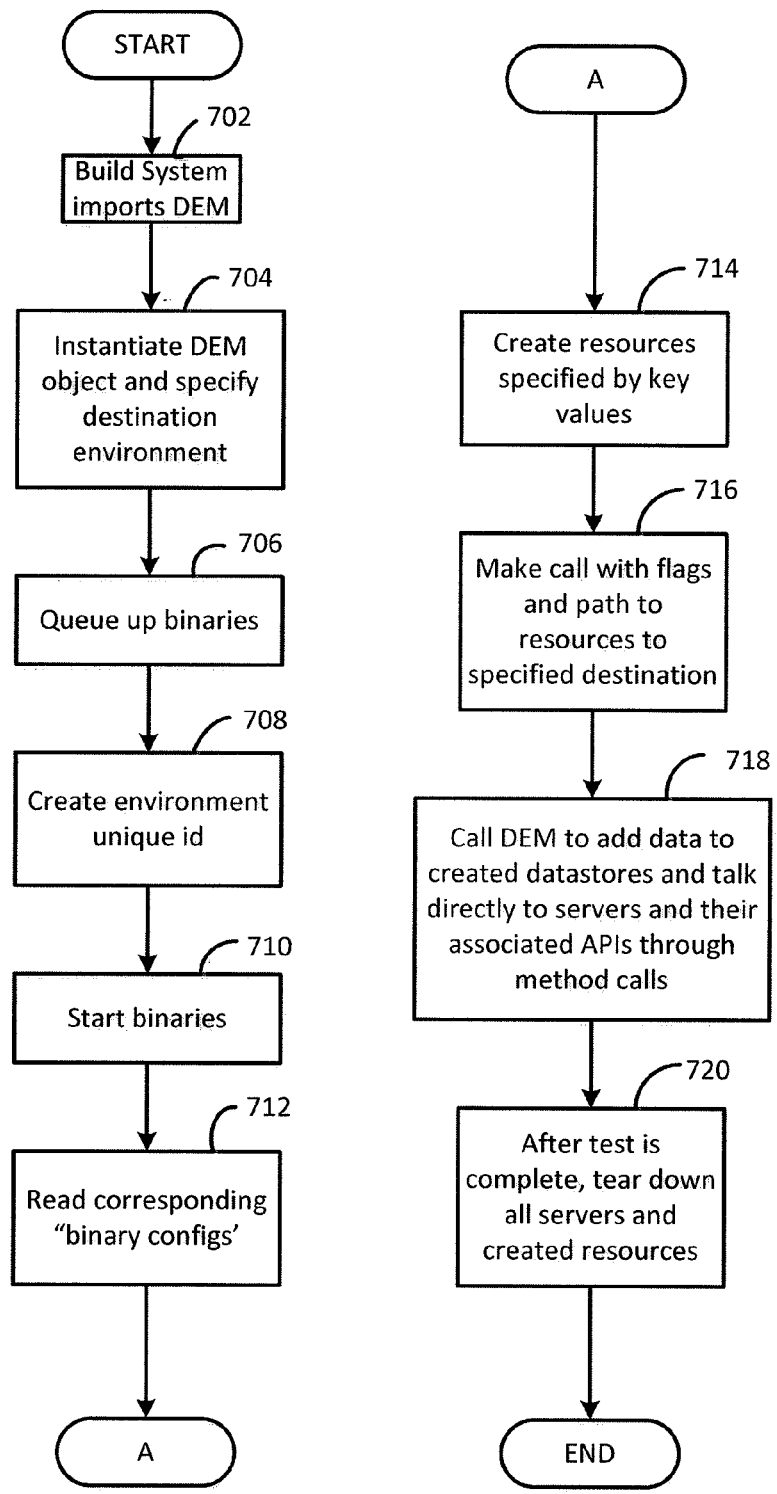
FIG. 7 is a flowchart of an example test using the Dynamic Environment Manager.

FIG. 7 is a flowchart for an example operation of a continuous build and test system using the Dynamic Environment Manager 120. To incorporate a Environment Manager, at step 702 a test specification can include a Dynamic Environment Manager object in a list of imports. At step 704, the DEM object is instantiated.

A developer can specify a destination test environment in a test specification. The destination test environment can be specified as local on a single machine or in a particular distributed cell. The resources that are required for a job (e.g., memory, CPU), flags to pass to the running binary, and system dependencies can be specified in the distributed system config file. Also, dependencies between binaries are specified in the config file. At step 706, a set of binaries to be included in the test environment are queued up. At step 708, a unique id for the test environment is generated. At step 710, dependencies between binaries are established and the set of binaries are started.

At step 712, the DEM reads respective binary configs for the binaries. As in the example shown in FIG. 4, a binary config can contain all necessary token and flag information with key values for data stores and resources and the string that the server will return when it is ready to accept test calls. At step 714, the DEM creates resources specified by key values in the configs. At step 716, the DEM makes a command line call using the tokens and flags and path to the resources to the specified environment. At step 718, the continuous build system may call the DEM to add data to created data stores, communicate directly to servers and their associated APIs through exposed method calls. At step 720, after test execution is completed, the continuous build system calls the DEM to tear down all servers and created resources as identified by the unique id.

Computing Device

Figure 8:
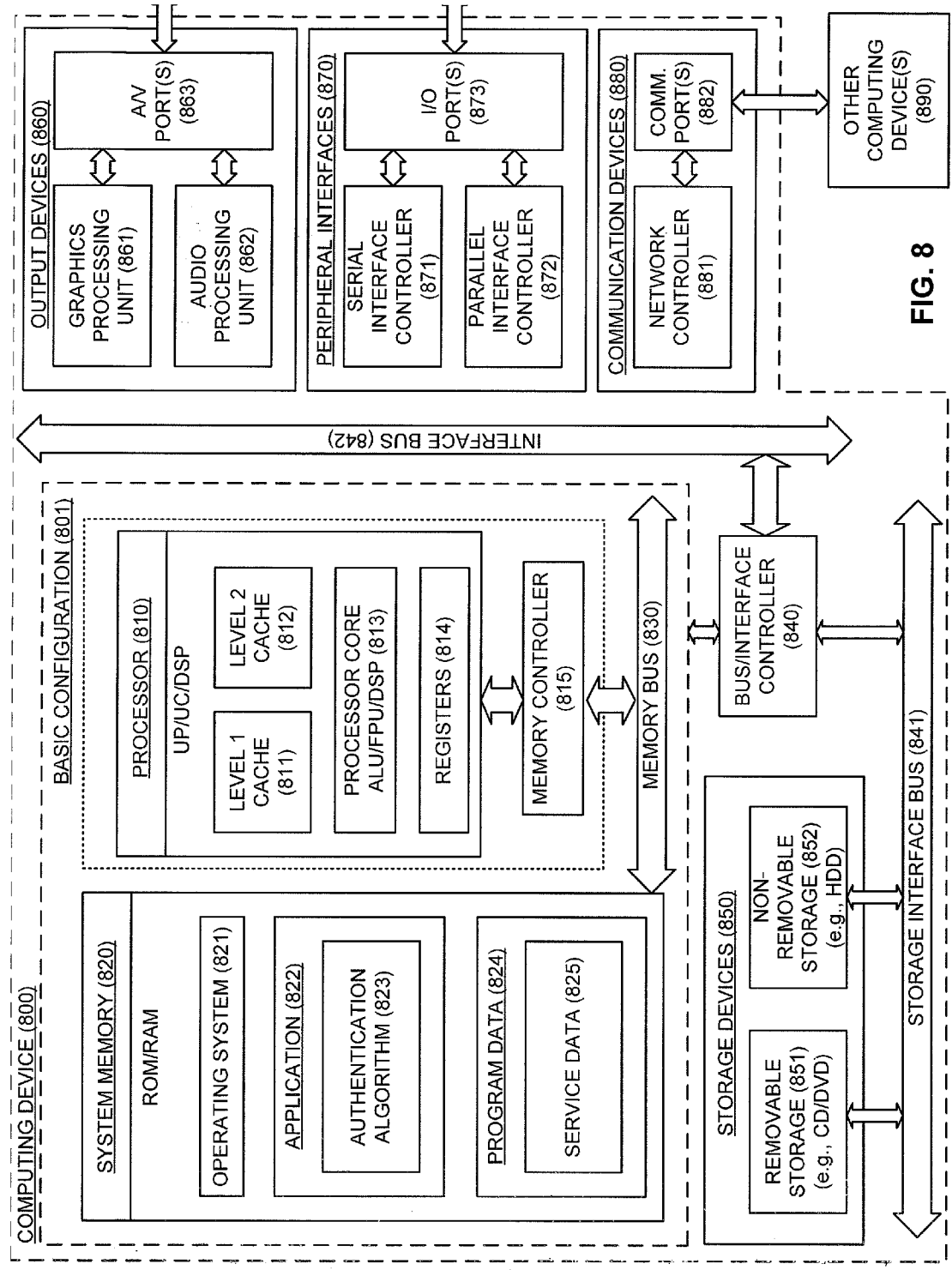
FIG. 8 shows a block diagram for a computer that can be used to implement a computer in the system of FIG. 1.

FIG. 8 is a block diagram illustrating an example computing device 800 that is arranged for a continuous build and test system in accordance with the present disclosure. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (µP), a microcontroller (µC), a digital signal processor (DSP), or any combination thereof. Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes a Dynamic Environment Manager 823. Program Data 824 includes configuration data 825 that is useful for specifying tokens and flags for binaries, as described above. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output devices 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication device 880 includes a network controller 881, which can be arranged to facilitate communications with one or more other computing devices 890 over a network communication via one or more communication ports 882. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method performed by one or more processors, the method comprising:
    receiving paths for locations of one or more executable binary files, and one or more binary configuration files, the one or more binary configuration files including one or more token settings specifying resources to be created in a test environment for the executable binary files;
    receiving test instructions specifying a platform where a test is to be performed on the environment;
    selecting the platform, among a plurality of platforms;
    performing testing using the binaries, including:
    instructing an environment manager to start a job for the one or more executable binary files in the selected platform;
    creating the data resources to be used during performance of the instructed test on the selected platform based on the token settings included in the one or more binary configuration files, said creating the data resources including creating a database of database schemas that relates data in a plurality of databases based on the token settings; and
    performing the instructed test using the test environment.

2. The method of claim 1, wherein the plurality of platforms include a distributed computer cluster, a local data processing machine, a mock of a production environment, and a production environment.

3. The method of claim 1, wherein a token setting of the token settings includes a unique identifier; wherein said instructing step includes naming the data resources using the unique identifier.

4. The method of claim 1, wherein a token setting of the token settings includes a unique identifier; wherein said instructing step includes naming the data resources using the unique identifier.

5. The method of claim 1, wherein the creating the database comprises creating a distributed storage system for structured data.

6. The method of claim 1, wherein the one or more executable binary files includes one or more mainline binary files.

7. The method of claim 1, wherein the one or more executable binary files includes one or more production-ready binary files.

8. The method of claim 1, wherein the plurality of platforms include a deployment environment, and wherein the testing is deployed to the deployment environment.

9. The method of claim 1, wherein the environment manager reports failures due starting jobs for binaries.

10. The method of claim 1, wherein the environment manager reports failures due to creating resources.

11. The method of claim 1, further comprising removing the data resources and test data from the platform upon completion of the tests.

12. The method of claim 1, further comprising storing the data resources and test data created in the platform in a persistent memory.

13. The method of claim 12, wherein the selected platform references the stored data resources during subsequent testing using a different set of executable binary files.

14. The method of claim 1, further comprising designating locations of a revised set of executable binary files, in which at least one of the one or more executable binary files has been modified; and performing said receiving, selecting and performing testing steps using the revised set of binary files.

15. The method of claim 1, further comprising selecting an alternative platform, different from the platform in which the testing was performed, and performing the instructed tests in the alternative platform.

16. The method of claim 1, wherein the test includes one of functional integration test and end-to-end test.

17. A system of one or more processors, the system comprising:
    an input for receiving a test specification that includes a list of imports, the list of imports includes an environment manager;
    the environment manager being created upon processing of the test specification, the environment manager delegating management functions to one or more specialized manager objects;
    the environment manager including config data that describes paths to one or more executable binary files, and to one or more binary configuration files including one or more token settings specifying resources to be created in a test environment for the executable binary files;
    a test platform comprising either of a local machine and a distributed computing system;
    the environment manager selecting the local machine or distributed computing system as the test platform to be used in testing the one or more binary files,
    the environment manager, by way of the specialized manager objects, performing testing, including:
    starting a job for the one or more executable binary files in the selected test platform based on the paths to the executable binary files;
    creating the data resources to be used during performance of the testing on the selected platform based on the token settings included in the one or more binary configuration files, said creating the data resources including creating a database of database schemas that relates data in a plurality of databases based on the token settings; and
    performing the job using the test environment.

18. The system of claim 17, wherein the plurality of platforms include a distributed computer cluster, a local data processing machine, a mock of a production environment, and a production environment.

19. The system of claim 17, wherein a token setting of the token settings includes a unique identifier wherein said starting includes naming the data resources using the unique identifier.

20. The system of claim 17, wherein a token setting of the token settings includes a unique identifier; wherein said starting includes naming the data resources using the unique identifier.

21. The system of claim 17, wherein the creating the database comprises creating a distributed storage system for structured data.

22. The system of claim 17, wherein the one or more executable binary files includes one or more mainline binary fries.

23. The system of claim 17, wherein the one or more executable binary files includes one or more production-ready binary files.

24. The system of claim 17, wherein the plurality of platforms include a deployment environment, and wherein the testing is deployed to the deployment environment.

25. The system of claim 17, wherein the environment manager reports failures due to starting jobs for the one or more executable binary files.

26. The system of claim 17, wherein the environment manager reports failures due to creating resources.

27. The system of claim 17, further comprising removing the data resources and test data from the platform upon completion of the tests.

28. The system of claim 17, further comprising storing the data resources and test data created in the platform in a persistent memory.

29. The system of claim 28, wherein the selected platform references the stored data resources during subsequent testing of a different set of executable binary files.

30. The system of claim 17, further comprising designating locations of a revised set of executable binary files, in which at least one of the one or more executable binary files has been modified; and performing said receiving, selecting and performing testing using the revised set of executable binary files.

31. The system of claim 17, further comprising selecting an alternative platform, different from the platform in which the testing was performed, and performing the instructed tests in the alternative platform.

32. The system of claim 17, wherein the test includes one of functional integration test and end-to-end test.

33. A non-transitory computer-readable storage medium storing instructions thereon which, when executed by one or more processors, cause said processors to perform steps of:
  receiving paths for locations of one or more executable binary files, and one or more binary configuration files, the one or more binary configuration files including one or more token settings specifying resources to be created in a test environment for the executable binary files;
  receiving test instructions specifying a platform where a test is to be performed on the environment;
  selecting the platform, among a plurality of platforms;
  performing testing using the binaries, including:
  instructing an environment manager to start a job for the one or more executable binary files in the selected platform;
  creating the data resources to be used during performance of the instructed test on the selected platform based on the token settings included in the one or more binary configuration files, said creating the data resources including creating a database of database schemas that relates data in a plurality of databases based on the token settings; and
  performing the instructed test using the test environment.

34. The non-transitory computer-readable storage medium of claim 33, wherein the plurality of platforms include a distributed computer cluster, a local data processing machine, a mock of a production environment, and a production environment.

35. The non-transitory computer-readable storage medium of claim 33, wherein a token setting of the token settings includes a unique identifier; wherein said instructing step includes naming the data resources using the unique identifier.

36. The non-transitory computer-readable storage medium of claim 33, wherein a token setting of the token settings includes a unique identifier; wherein said instructing step includes naming the data resources using the unique identifier.

37. The non-transitory computer-readable storage medium of claim 33, wherein the creating the database comprises creating a distributed storage system for structured data.

38. The non-transitory computer-readable storage medium of claim 33, wherein the one or more executable binary files includes one or more mainline binary files.

39. The non-transitory computer-readable storage medium of claim 33, wherein the one or more executable binary files includes one or more production-ready binary files.

40. The non-transitory computer-readable storage medium of claim 33, wherein the plurality of platforms include a deployment environment, and wherein the testing is deployed to the deployment environment.

41. The non-transitory computer-readable storage medium of claim 33, wherein the environment manager reports failures due starting jobs for binaries.

42. The non-transitory computer-readable storage medium of claim 33, wherein the environment manager reports failures due to creating resources.

43. The non-transitory computer-readable storage medium of claim 33, further comprising removing the data resources and test data from the platform upon completion of the tests.

44. The non-transitory computer-readable storage medium of claim 33, further comprising storing the data resources and test data created in the platform in a persistent memory.

45. The non-transitory computer-readable storage medium of claim 44, wherein the selected platform references the stored data resources during subsequent testing using a different set of executable binary files.

46. The non-transitory computer-readable storage medium of claim 33, further comprising designating locations of a revised set of executable binary files, in which at least one of the one or more executable binary files has been modified; and performing said receiving, selecting and performing testing steps using the revised set of executable binary files.

47. The non-transitory computer-readable storage medium of claim 33, further comprising selecting an alternative platform, different from the platform in which the testing was performed, and performing the instructed tests in the alternative platform.

48. The non-transitory computer-readable storage medium of claim 33, wherein the test includes one of functional integration test and end-to-end test.

* * * * *